(12) United States Patent
Kitaichi et al.

(10) Patent No.: US 8,675,460 B2
(45) Date of Patent: Mar. 18, 2014

(54) OPTICAL DISC DEVICE

(75) Inventors: Yasunori Kitaichi, Tokyo (JP); Shinichi Nakao, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 13/425,643

(22) Filed: Mar. 21, 2012

(65) Prior Publication Data

US 2012/0243391 A1  Sep. 27, 2012

(30) Foreign Application Priority Data

Mar. 24, 2011 (JP) .................... 2011-066477

(51) Int. Cl.
G11B 7/00  (2006.01)

(52) U.S. Cl.
USPC .................................... 369/44.41

(58) Field of Classification Search
USPC ...................................... 369/44.41
See application file for complete search history.

(56) References Cited

U.S. PATENT DOCUMENTS

| | | | | |
|---|---|---|---|---|
| 4,504,938 A | * | 3/1985 | Tajima | 369/44.14 |
| 6,392,971 B1 | * | 5/2002 | Takiguchi et al. | 369/47.53 |
| 7,283,438 B2 | | 10/2007 | Ugawa | |
| 7,365,296 B2 | | 4/2008 | Tsukihashi | |
| 2004/0156277 A1 | * | 8/2004 | Kuwayama | 369/44.29 |
| 2005/0036411 A1 | | 2/2005 | Ugawa | |
| 2007/0001092 A1 | | 1/2007 | Tsukihashi | |
| 2007/0133366 A1 | * | 6/2007 | Sawada | 369/44.35 |
| 2008/0175115 A1 | * | 7/2008 | Muraoka | 369/53.12 |

FOREIGN PATENT DOCUMENTS

| | | | | |
|---|---|---|---|---|
| JP | 07262584 A | * | 10/1995 | G11B 7/095 |
| JP | 2000090450 A | | 3/2000 | |
| JP | 2004241081 A | | 8/2004 | |
| JP | 2005063566 A | | 3/2005 | |
| JP | 2007012200 A | | 1/2007 | |
| JP | 4001024 B2 | | 10/2007 | |

OTHER PUBLICATIONS

Office Action for corresponding JP Application No. 2011-066477, dated Feb. 5, 2013.
Office Action for corresponding JP Application No. 2011-066477, dated Jun. 25, 2013.

* cited by examiner

*Primary Examiner* — Brenda Bernardi
(74) *Attorney, Agent, or Firm* — Matthew B. Dernier, Esq.; Gibson & Dernier LLP (57) ABSTRACT

Provided is an optical disc device including: an objective lens; a plurality of light-receiving elements each for outputting an output signal corresponding to a light amount of reflected light from the optical disc medium; a plurality of amplifiers each for amplifying the output signal from a corresponding one of the light-receiving elements; and a signal output circuit for outputting a focus error signal based on amplified signals from the amplifiers. The optical disc device executes focus servo control of controlling, based on the focus error signal, a position of the objective lens so as to keep constant a distance between the objective lens and a signal surface; moves the objective lens to a position at which accuracy of reading information from the optical disc medium becomes high; and thereafter adjusts a gain of each amplifier so that levels of the amplified signals become close to each other.

12 Claims, 10 Drawing Sheets

FIG.2

TO SIGNAL OUTPUT CIRCUIT 17

OPTICAL DISC DEVICE

CROSS-REFERENCE TO RELATED APPLICATION

The present application claims priority from Japanese application JP 2011-066477 filed on Mar. 24, 2011, the content of which is hereby incorporated by reference into this application.

BACKGROUND OF THE INVENTION

1. Field of the Invention

The present invention relates to an optical disc device for reading information recorded on an optical disc medium such as a CD, a DVD, and a Blu-ray disc (registered trademark), a method of controlling the optical disc device, and an information storage medium having a program for controlling the optical disc device stored thereon.

2. Description of the Related Art

In recent years, various optical disc media are used as information recording media. In general, an optical disc medium is constructed of a plurality of layers such as a data recording layer on which the information is recorded and a protective layer for protecting the data recording layer. An optical disc device is used to read information recorded on such an optical disc medium. The optical disc device includes an optical pickup which irradiates the optical disc medium with light to detect reflected light from the optical disc medium.

When the optical disc device reads information recorded on the optical disc medium, an objective lens within the optical pickup needs to be brought into focus on a signal surface (surface of the data recording layer) of the optical disc medium. Accordingly, when reading information, the optical disc device performs, based on an output signal from the optical pickup, a focus detection operation of detecting an in-focus state in which the objective lens is in focus on the signal surface (see, for example, Japanese Patent No. 4001024).

By using a focus error signal (hereinbelow, referred to as FE signal) indicating a deviation of the focus of the objective lens with respect to the signal surface, the optical disc device can detect the in-focus state through an astigmatism method. Specifically, when the objective lens is gradually moved closer to the surface of the optical disc medium, the FE signal exhibits an S-shaped waveform around a timing at which the objective lens becomes in focus on the signal surface. By utilizing the above-mentioned waveform of the FE signal, the optical disc device detects the in-focus state. Hereinbelow, the position of the objective lens obtained when the objective lens is in focus on the signal surface is referred to as an in-focus position.

Figure 9A:
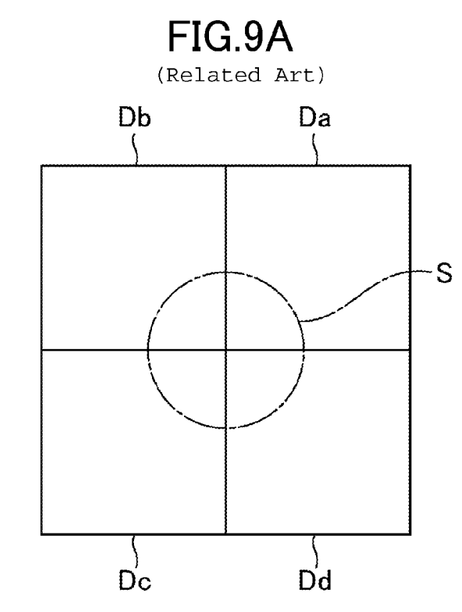
FIG. 9A is a diagram illustrating the shape of a spot detected by a photodetector when the objective lens is at an in-focus position.
Figure 9B:
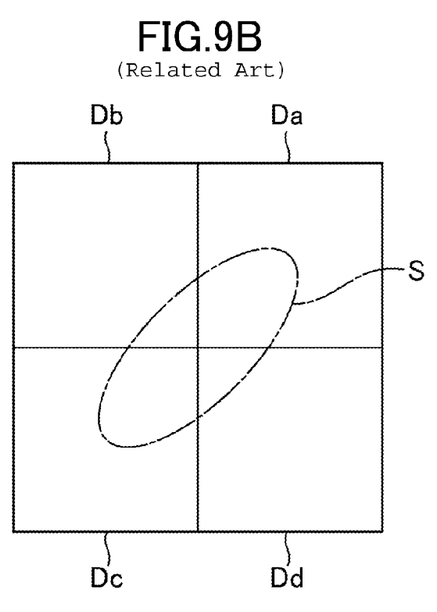
FIG. 9B is a diagram illustrating the shape of the spot detected by the photodetector when the objective lens is closer to the optical disc medium compared to the in-focus position.
Figure 9C:
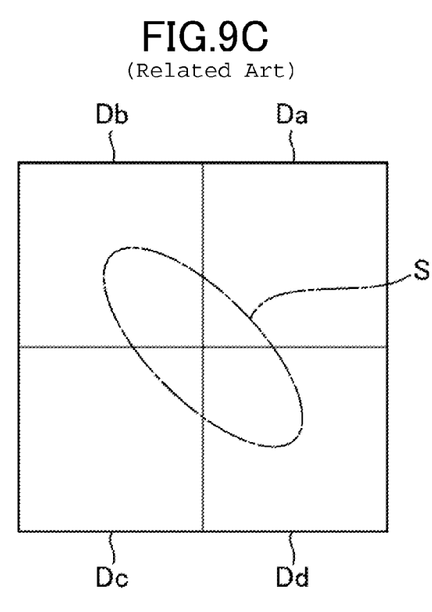
FIG. 9C is a diagram illustrating the shape of the spot detected by the photodetector when the objective lens is farther from the optical disc medium compared to the in-focus position.

A specific example of a method of generating the FE signal is described. FIGS. 9A to 9C are diagrams each illustrating the shape of a spot S formed when a photodetector within the optical pickup is irradiated with reflected light from the optical disc medium. In FIGS. 9A to 9C, the spot 0 is indicated by an alternate long and short dash line. In this example, the photodetector includes four light-receiving elements Da to Dd arranged in a 2×2 matrix, and each of the light-receiving elements Da to Dd receives the reflected light from the optical disc medium, and outputs a signal indicating a light amount thereof. When the objective lens is in focus on the signal surface, the spot S becomes a circle as illustrated in FIG. 9A, and thus each of the light-receiving elements Da to Dd detects light having substantially the same light amount. However, when the focus of the objective lens becomes slightly deviated from the signal surface, the spot S becomes an ellipse, and, in addition, a major axis direction of the ellipse varies between a case where the objective lens is deviated in such a direction that the objective lens moves closer to the optical disc medium and a case where the objective lens is deviated in such a direction that the objective lens moves away from the optical disc medium. FIG. 9B illustrates the spot S obtained when the objective lens is closer to the optical disc medium compared to the in-focus position, whereas FIG. 9C illustrates the spot S obtained when the objective lens is farther from the optical disc medium compared to the in-focus position.

When La to Ld represent the levels of the output signals output from the light-receiving elements Da to Dd, respectively, an FE signal level Lfe is calculated, for example, as follows.

$$Lfe = (La+Lc) - (Lb+Ld)$$

Figure 10:
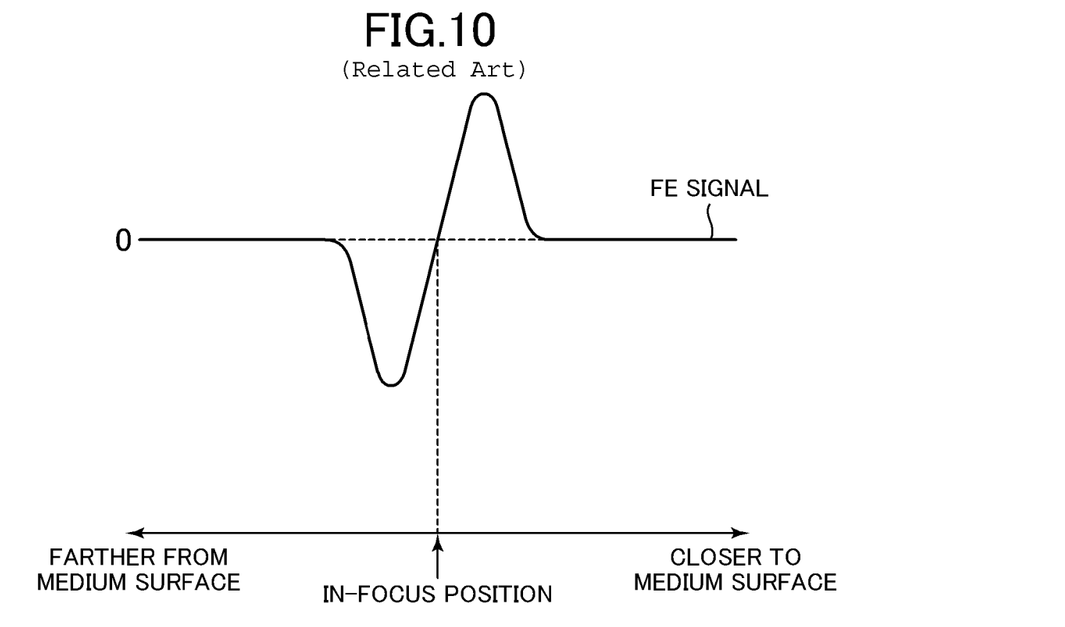
FIG. 10 is a diagram illustrating an example of a waveform of the focus error signal.

The term (La+Lc) represents a total sum of amounts of light received by the light-receiving elements Da and Dc arranged along a diagonal line extending from the upper right to the lower left of a detection surface of the photodetector. This diagonal line corresponds to the major axis direction of the ellipse illustrated in FIG. 9B, which is formed by the spot S when the objective lens is closer to the optical disc medium compared to the in-focus position. Further, the term (Lb+Ld) represents a total sum of amounts of light received by the light-receiving elements Db and Dd arranged along a diagonal line intersecting the above-mentioned diagonal line. This diagonal line corresponds to the major axis direction of the ellipse illustrated in FIG. 9C, which is formed by the spot S when the objective lens is farther from the optical disc medium compared to the in-focus position. Accordingly, when the objective lens is gradually moved closer to the optical disc medium, the spot S first takes the shape illustrated in FIG. 9C before the in-focus position, and the FE signal exhibits a negative peak. After that, the spot S becomes the circle illustrated in FIG. 9A at the in-focus position, and the magnitude of the FE signal at that time becomes 0. When the objective lens is further moved closer to the optical disc medium, the spot S takes the shape illustrated in FIG. 9B, and the FE signal in this case exhibits a positive peak. FIG. 10 illustrates an S-shaped waveform exhibited by the FE signal in the vicinity of the in-focus position when the above-mentioned control is executed. The optical disc device can identify the in-focus position of the objective lens by detecting, while bringing the objective lens closer to the optical disc medium, a timing at which the FE signal becomes 0 after exhibiting the negative peak once, or by detecting, while moving the objective lens away from the optical disc medium, a timing at which the FE signal becomes 0 after exhibiting the positive peak. Once the in-focus position is identified, the optical disc device performs feedback control (focus servo control) of adjusting the position of the objective lens so as to maintain this level of the FE signal, with the result that it is possible to maintain a state in which the objective lens is in focus on the signal surface of the optical disc medium. The reading of information from the optical disc medium is performed when the focus servo control is in execution.

In the above-mentioned optical disc device of the related art example, if the position of the spot S illustrated in FIG. 9A is deviated from the center position of the photodetector, it becomes difficult to detect the in-focus position accurately. This is because if the position of the spot S is deviated from the center position, the magnitude of the FE signal does not become 0 and, instead, becomes deviated to a positive or negative side even when the spot S is a circle. Such a deviation of the FE signal is caused by various factors. For example, if the mounting position of the photodetector is deviated from the optical axis of the reflected light at the time of manufacturing the optical disc device, there occurs a deviation in the FE signal as well. Further, while the optical disc device is in use, in addition to the above-mentioned focus servo control, there is also performed tracking servo control in which the objective lens is moved along a radial direction of the optical disc medium so that the objective lens follows a track provided to the signal surface of the optical disc medium. In the tracking servo control, the objective lens is moved along a direction parallel to the surface of the optical disc medium in a relative manner with respect to the optical axis of a laser beam. Accordingly, due to the movement of the objective lens resulting from the above-mentioned tracking servo control, the relative position of the reflected light with respect to the photodetector also moves. Such relative movement of the objective lens causes the S-shaped waveform which appears in the FE signal to become asymmetric with respect to the in-focus position, which may have an adverse effect on accuracy in focus detection.

SUMMARY OF THE INVENTION

In view of the above-mentioned circumstances, the present invention has been made, and an object thereof is to provide an optical disc device capable of correcting a deviation which occurs in an FE signal due to a positional deviation of a spot formed by reflected light with respect to a photodetector, and also to provide a method of controlling the optical disc device and an information storage medium having a control program for the optical disc device stored therein.

According to the present invention, there is provided an optical disc device for reading information recorded on an optical disc medium, including: an objective lens for focusing light onto the optical disc medium; a plurality of light-receiving elements arranged side by side, each for receiving reflected light from the optical disc medium and outputting an output signal corresponding to a light amount of the reflected light; a plurality of amplifiers each for amplifying the output signal output from a corresponding one of the plurality of light-receiving elements; a signal output circuit for outputting, based on amplified signals respectively output from the plurality of amplifiers, a focus error signal indicating a deviation of a focal position of the objective lens with respect to a signal surface of the optical disc medium; a focus servo control unit for controlling, based on the focus error signal, a position of the objective lens so as to keep constant a distance between the objective lens and the signal surface; a position adjusting unit for moving the objective lens to a position at which accuracy of reading the information from the optical disc medium becomes high; and a gain adjusting unit for adjusting a gain of each of the plurality of amplifiers so that levels of the amplified signals respectively output from the plurality of amplifiers become close to each other after the position adjusting unit moves the objective lens.

According to the present invention, there is also provided a method of controlling an optical disc device, the optical disc device including: an objective lens for focusing light onto an optical disc medium having information recorded thereon; a plurality of light-receiving elements arranged side by side, each for receiving reflected light from the optical disc medium and outputting an output signal corresponding to a light amount of the reflected light; a plurality of amplifiers each for amplifying the output signal output from a corresponding one of the plurality of light-receiving elements; and a signal output circuit for outputting, based on amplified signals respectively output from the plurality of amplifiers, a focus error signal indicating a deviation of a focal position of the objective lens with respect to a signal surface of the optical disc medium, the method including: a focus servo control step of controlling, based on the focus error signal, a position of the objective lens so as to keep constant a distance between the objective lens and the signal surface; a position adjusting step of moving the objective lens to a position at which accuracy of reading the information from the optical disc medium becomes high; and a gain adjusting step of adjusting a gain of each of the plurality of amplifiers so that levels of the amplified signals respectively output from the plurality of amplifiers become close to each other after the objective lens is moved in the position adjusting step.

According to the present invention, there is also provided a non-transitory computer-readable information storage medium having stored thereon a program for controlling an optical disc device, the optical disc device including: an objective lens for focusing light onto an optical disc medium having information recorded thereon; a plurality of light-receiving elements arranged side by side, each for receiving reflected light from the optical disc medium and outputting an output signal corresponding to a light amount of the reflected light; a plurality of amplifiers each for amplifying the output signal output from a corresponding one of the plurality of light-receiving elements; and a signal output circuit for outputting, based on amplified signals respectively output from the plurality of amplifiers, a focus error signal indicating a deviation of a focal position of the objective lens with respect to a signal surface of the optical disc medium, the program including instructions that cause a computer to: control, based on the focus error signal, a position of the objective lens so as to keep constant a distance between the objective lens and the signal surface; move the objective lens to a position at which accuracy of reading the information from the optical disc medium becomes high; and adjust again of each of the plurality of amplifiers so that levels of the amplified signals respectively output from the plurality of amplifiers become close to each other after the objective lens is moved to the position at which accuracy of reading the information from the optical disc medium becomes high.

DETAILED DESCRIPTION OF THE INVENTION

An optical disc device for reading information recorded on an optical disc medium according to an embodiment of the present invention includes: an objective lens for focusing light onto the optical disc medium; a plurality of light-receiving elements arranged side by side, each for receiving reflected light from the optical disc medium and outputting an output signal corresponding to a light amount of the reflected light; a plurality of amplifiers each for amplifying the output signal from a corresponding one of the plurality of light-receiving elements; a signal output circuit for outputting, based on amplified signals respectively output from the plurality of amplifiers, a focus error signal indicating a deviation of a focal position of the objective lens with respect to a signal surface of the optical disc medium; a focus servo control unit for controlling, based on the focus error signal, a position of the objective lens so as to keep constant a distance between the objective lens and the signal surface; a position adjusting unit for moving the objective lens to a position at which accuracy of reading the information from the optical disc medium becomes high; and a gain adjusting unit for adjusting a gain of each of the plurality of amplifiers so that levels of the amplified signals respectively output from the plurality of amplifiers become close to each other after the position adjusting unit moves the objective lens.

In the optical disc device, the gain adjusting unit may adjust the gain of the each of the plurality of amplifiers so that the levels of the amplified signals respectively output from the plurality of amplifiers become close to each other after the position adjusting unit moves the objective lens, and that a total sum of the amplified signals respectively output from the plurality of amplifiers does not change before and after the adjustment.

Further, in the optical disc device, the position adjusting unit may acquire, by changing the position of the objective lens, a plurality of evaluation values each indicating the accuracy of reading the information from the optical disc medium at one of a plurality of different positions, and may move the objective lens to a position determined based on the acquired plurality of evaluation values. The evaluation value may include a jitter value.

Hereinafter, embodiments of the present invention are described in detail referring to the accompanying drawings.

First Embodiment

Figure 1:
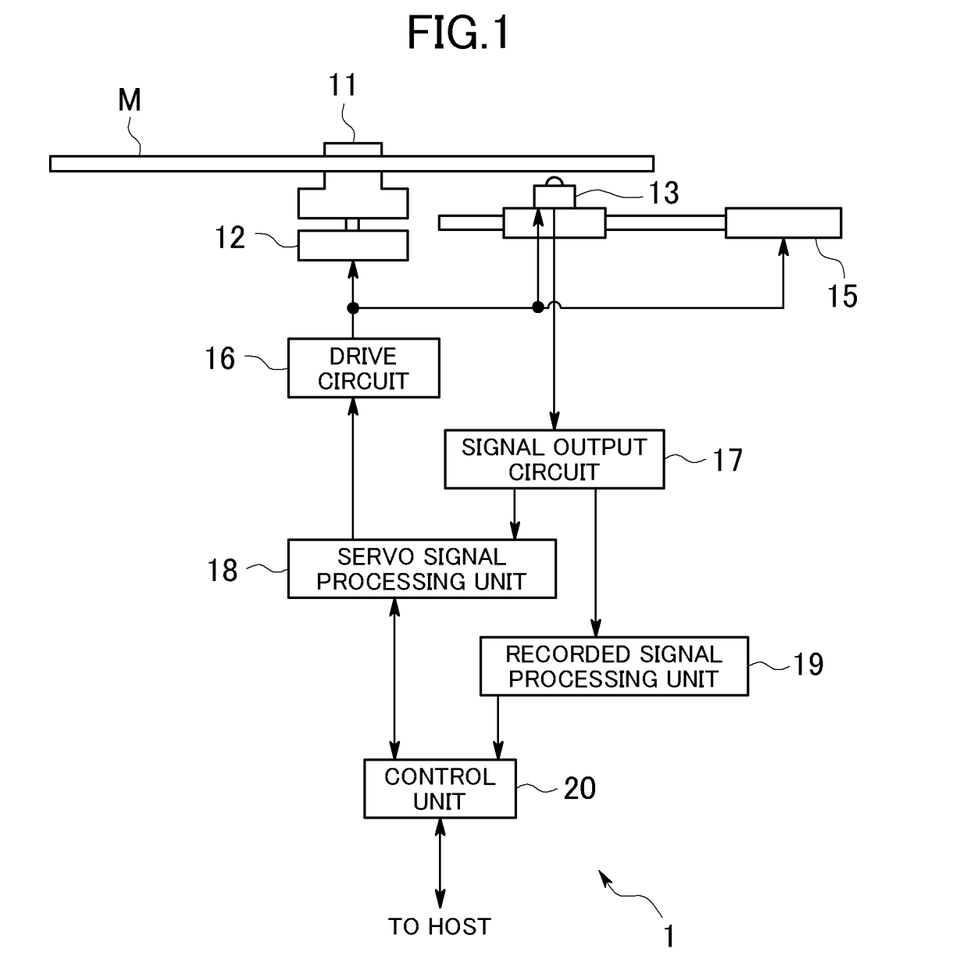
FIG. 1 is a block diagram illustrating a configuration example of an optical disc device according to a first embodiment of the present invention.

An optical disc device 1 according to a first embodiment of the present invention reads information recorded on an optical disc medium. As illustrated in FIG. 1, the optical disc device 1 includes a medium supporting portion 11, a spindle motor 12, an optical pickup 13, a feed motor 15, a drive circuit 16, a signal output circuit 17, a servo signal processing unit 18, a recorded signal processing unit 19, and a control unit 20.

An optical disc medium M, from which the information is to be read by the optical disc device 1, includes a data recording layer on which the information is recorded, and protective layers for protecting the data recording layer, which are provided on both sides of the data recording layer. Hereinafter, a surface of the data recording layer is referred to as a signal surface. Note that, the optical disc medium M may include a plurality of data recording layers. The optical disc device 1 may be configured not only to read the information recorded on the optical disc medium M but also to be capable of writing the information on the optical disc medium M. Further, the optical disc device 1 may also be configured to be capable of reading the information recorded on a plurality of types of the optical disc media M such as a CD, a DVD, and a Blu-ray disc.

The medium supporting portion 11 rotatably supports the optical disc medium M. The medium supporting portion 11 also rotates the optical disc medium M by power transmitted from the spindle motor 12.

Figure 2:
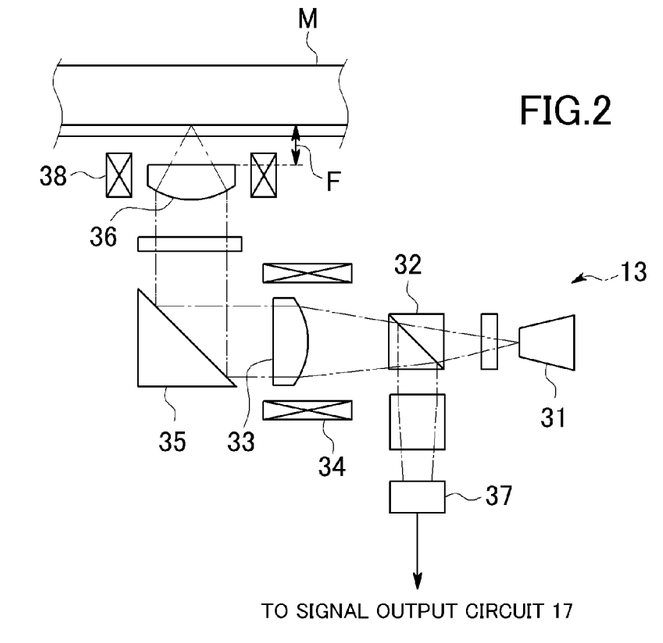
FIG. 2 is a schematic view illustrating an internal configuration example of an optical pickup of the optical disc device according to the first embodiment of the present invention.

The optical pickup 13 irradiates the optical disc medium M with a laser beam, and detects reflected light of the irradiated light by the optical disc medium M to output an output signal according to the detected reflected light. FIG. 2 is a view illustrating an internal configuration example of the optical pickup 13. In the example illustrated in FIG. 2, the optical pickup 13 includes a light-emitting element 31, a polarization beam splitter 32, a collimator lens 33, a collimator lens driving unit 34, an erecting mirror 35, an objective lens 36, a photodetector 37, and an objective lens driving unit 38.

The light-emitting element 31 is a semiconductor laser element for outputting a laser beam having a predetermined wavelength. The output light emitted from the light-emitting element 31 passes through the polarization beam splitter 32 and the collimator lens 33, and is then, reflected by the erecting mirror 35. Further, the output light reflected by the erecting mirror 35 is focused by the objective lens 36 on a focal position apart from the objective lens 36 by a length F to be reflected by the optical disc medium M.

After the reflected light by the optical disc medium M passes through the objective lens 36, the reflected light is reflected by the erecting mirror 35 to be guided by the polarization beam splitter 32 toward the photodetector 37. The photodetector 37 includes four light-receiving elements Da to Dd arranged in a matrix of, for example, two by two. When the reflected light guided by the polarization beam splitter 32 reaches the light-receiving elements Da to Dd, the photodetector 37 outputs a signal according to an intensity of the light received by each of the four light-receiving elements Da to Dd as an output signal. Note that, hereinbelow, in the photodetector 37, an area irradiated with the reflected light from the optical disc medium M is referred to as a spot S.

The collimator lens driving unit 34 includes an actuator and the like, and drives the collimator lens 33 forward and backward along an optical axis direction of the laser beam. The collimator lens driving unit 34 moves the collimator lens 33 along the optical axis direction to enable the correction of spherical aberration of the objective lens 36.

The objective lens driving unit 38 includes an actuator and the like, and moves the objective lens 36 along two directions, that is, a radial direction of the optical disc medium M (hereinbelow, referred to as tracking direction) and a direction perpendicular to the surface of the optical disc medium M (hereinbelow, referred to as focus direction). When the objective lens driving unit 38 moves the objective lens 36 along the focus direction, a distance from the objective lens 36 to the surface of the optical disc medium M is changed.

The feed motor 15 moves the whole optical pickup 13 along the tracking direction. By the driving of the feed motor 15, the optical pickup 13 can move from a position in the vicinity of the center of the optical disc medium M to the position in the vicinity of an outer periphery of the optical disc medium M.

The drive circuit 16 outputs driving signals for driving the spindle motor 12, the feed motor 15, the collimator lens driving unit 34, and the objective lens driving unit 38 in accordance with the control signal input from the servo signal processing unit 18. A rotation speed of the spindle motor 12 changes according to the driving signal from the drive circuit 16. As a result, a rotation speed of the optical disc medium M is controlled. Moreover, by the driving of the objective lens driving unit 38 and the feed motor 15 in accordance with the driving signals from the drive circuit 16, a distance of the objective lens 36 from the rotation axis of the optical disc medium M and a distance from the objective lens 36 to the surface of the optical disc medium M are controlled.

The signal output circuit 17, the servo signal processing unit 18, the recorded signal processing unit 19, and the control unit 20 are realized by, for example, an analog circuit for processing an analog signal output from the optical pickup 13, an A/D converter for converting the analog signal into a digital signal, and a digital signal processor (DSP) or a microcomputer for processing the digital signal obtained by the conversion.

Figure 3:
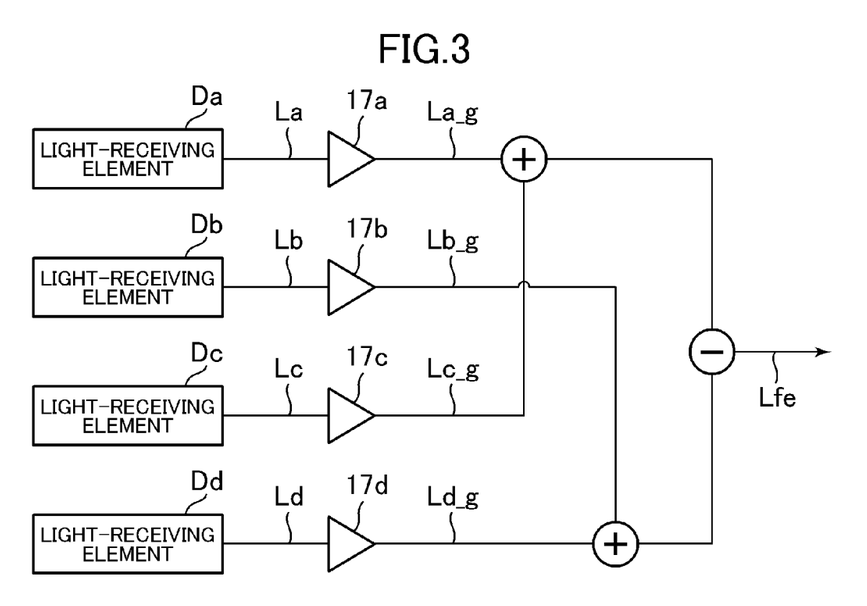
FIG. 3 is a diagram illustrating an example of a circuit for calculating a focus error signal.

The signal output circuit 17 outputs various signals based on the respective analog signals output from the light-receiving elements Da to Dd. Specifically, the signal output circuit 17 performs a computation with respect to amplified signals obtained by amplifying, with given gains (amplification factors), the output signals from the respective light-receiving elements, to thereby calculate a focus error signal (FE signal) indicating a deviation of the objective lens 36 from an in-focus position. FIG. 3 is a diagram illustrating, in particular, a configuration of a circuit portion of the signal output circuit 17 which calculates the FE signal. As illustrated in FIG. 3, the signal output circuit 17 includes amplifiers 17a to 17d, and the amplifiers 17a to 17d output the amplified signals obtained by amplifying the output signals from the light-receiving elements Da to Dd, respectively. Note that, in FIG. 3, a circled mark "+" represents an adding circuit for outputting a signal obtained by adding two input signals, and a circled mark "−" represents a subtracting circuit for outputting a difference between two input signals. An FE signal level Lfe output from the circuit described above is expressed by the following equation:

$$Lfe=(La\_g+Lc\_g)-(Lb\_g+Ld\_g)$$

where La_g, Lb_g, Lc_g, and Ld_g represent the levels of the amplified signals output from the amplifiers 17a to 17d, respectively. The levels La_g, Lb_g, Lc_g, and Ld_g of the amplified signals are expressed by the following equations, respectively:

$$La\_g=La \cdot Ga$$

$$Lb\_g=Lb \cdot Gb$$

$$Lc\_g=Lc \cdot Gc$$

$$Ld\_g=Ld \cdot Gd$$

where La to Ld represent the levels of the output signals output from the light-receiving elements Da to Dd, respectively, and Ga to Gd represent the gains of the amplifiers 17a to 17d, respectively.

Assuming that the reflected light from the optical disc medium M always enters a center position of the photodetector 37, La, Lb, Lc, and Ld are all equal when the objective lens 36 is at the in-focus position. In this case, when Ga, Gb, Gc, and Gd are all equal, La_g, Lb_g, Lc_g, and Ld_g all become equal as well, with the result that the FE signal level Lfe becomes 0. However, if the incident position of the reflected light (that is, the position of the spot S) is deviated from the center of the photodetector 37 for various reasons, La, Lb, Lc, and Ld may not become equal even when the objective lens 36 is at the in-focus position, with the result that the FE signal level Lfe does not become 0. To address this, in this embodiment, the gains Ga, Gb, Gc, and Gd of the amplifiers 17a to 17d are controlled separately, and adjustment is performed so that the FE signal level Lfe obtained when the objective lens 36 is at the in-focus position is adjusted to 0 even in the case where the position of the spot S is deviated from the center of the photodetector 37. A specific example of such an adjustment method is described later.

Further, though not illustrated in FIG. 3, in addition to the FE signal, the signal output circuit 17 outputs an RF signal for data reproduction and a tracking error signal (TE signal) indicating a deviation in the tracking direction between the focal position of the objective lens 36 and a track position of the optical disc medium M. Further, the signal output circuit 17 also outputs a pull-in signal (PI signal) obtained by amplifying the output signals from the light-receiving elements Da to Dd and adding all the amplified output signals. A level Lpi of the pull-in signal is expressed by the following equation.

$$Lpi = La\_g + Lb\_g + Lc\_g + Ld\_g$$

The servo signal processing unit 18 generates various signals for servo control based on the PI signal, the FE signal, and the TE signal which are output from the signal output circuit 17, and outputs the generated signals to the control unit 20. The servo signal processing unit 18 outputs a control signal to the drive circuit 16 for driving the objective lens driving unit 38, the feed motor 15, and the spindle motor 12 in accordance with an instruction input from the control unit 20.

In particular, the servo signal processing unit 18 performs servo control in accordance with an instruction from the control unit 20. Specifically, upon input of the instruction for starting the servo control from the control unit 20, the servo signal processing unit 18 outputs the control signal for controlling the objective lens driving unit 38 in accordance with the FE signal input from the signal output circuit 17 to perform focus servo control for the positional adjustment of the focus direction of the objective lens 36. As a result, the focus of the objective lens 36 is maintained on the signal surface of the optical disc medium M. Further, the servo signal processing unit 18 outputs the control signal for controlling the objective lens driving unit 38 in accordance with the TE signal input from the signal output circuit 17, to thereby perform tracking servo control for changing the position of the objective lens 36 in the tracking direction. As a result, the objective lens 36 moves in a relative manner with respect to the medium surface so that the focus of the objective lens 36 follows the track in the data recording layer. As described above, through the servo control executed by the servo signal processing unit 18, a relative position of the objective lens 36 with respect to the surface of the optical disc medium M is controlled. As a result, a state in which the optical pickup 13 can read information from the optical disc medium M is maintained, and the information is read during that time.

The recorded signal processing unit 19 demodulates a digital signal indicating the information recorded on the optical disc medium M based on the RF signal output from the signal output circuit 17, and outputs the demodulated digital signal to the control unit 20. The recorded signal processing unit 19 also calculates an evaluation value (such as RF amplitude or jitter value) for reading accuracy of the optical pickup 13 for the information recorded on the optical disc medium M, and outputs the calculated evaluation value to the control unit 20. Hereinafter, as a specific example, the recorded signal processing unit 19 measures the jitter value indicating a time deviation of rising timing of an RF signal waveform with respect to a reference clock, and outputs the measured jitter value to the control unit 20.

The control unit 20 is constituted by, for example, a microcomputer, and includes an execution module and a storage element. In the storage element of the control unit 20, a program to be executed and various parameters are stored. The execution module performs processing in accordance with the program stored in the storage element. Specifically, the control unit 20 performs processing (focus detection processing) of detecting an in-focus position of the objective lens 36 based on signals input from the servo signal processing unit 18 (such as signal indicating the result of predetermined judgment performed on the FE signal) and setting the objective lens 36 at the in-focus position.

Further, the control unit 20 is connected to a personal computer, a main body of a consumer game machine, a video decoder or the like, which serves as a host. In response to a request from the host, the control unit 20 outputs a command for driving the feed motor and the objective lens driving unit 38 to the servo signal processing unit 18 to move the focal position of the objective lens 36 (specifically, an information reading position on the optical disc medium M) to a desired position on the optical disc medium M. In addition to the operation described above, the control unit outputs a command for changing a rotation speed of the spindle motor 12 to the servo signal processing unit 18 to adjust the rotation speed of the optical disc medium M. Then, in this state, the control unit 20 outputs the signal obtained by demodulating the signal read from the optical disc medium M, which is output from the recording signal processing unit 19, to the host.

Figure 4:
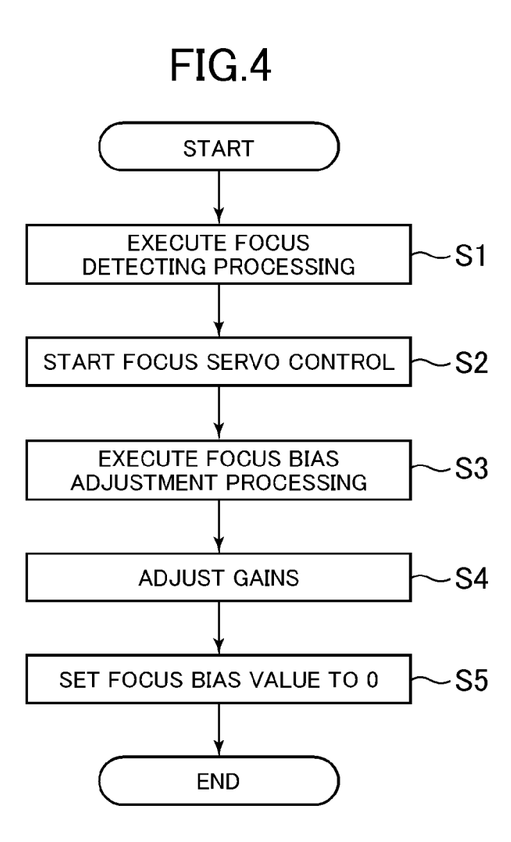
FIG. 4 is a flow chart illustrating an example of a flow of processing executed by the optical disc device according to the first embodiment of the present invention.

Hereinbelow, referring to a flowchart of FIG. 4, description is given of a specific example of processing in which the optical disc device 1 adjusts the gains Ga to Gd to correct the deviation of the FE signal. This processing is executed, for example, when a new optical disc medium M has been set in the optical disc device 1, or when the optical disc device 1 has been powered on. Further, this processing is implemented by the control unit 20 controlling the respective components in accordance with the program stored in the storage element. This program may be provided by being stored in various kinds of computer-readable information storage medium.

First, the control unit 20 executes the focus detection processing (S1). Specifically, the control unit 20 controls the objective lens driving unit 38 to move the objective lens 36 to a predetermined initial position, and then to move the objective lens 36 gradually at a fixed speed from the initial position along the focus direction so that the objective lens 36 is moved closer to the surface of the optical disc medium M. On this occasion, the objective lens 36 is moved along the focus direction in a range including the in-focus position. Then, during this movement, by using the FE signal output from the signal output circuit 17, a timing at which the FE signal level Lfe becomes 0 after exhibiting a negative peak is detected. The control unit 20 identifies the position of the objective lens 36 obtained at the detected timing as the in-focus position.

In the processing of S1, the control unit 20 performs the focus detection with a common predetermined value set for all the amplifiers 17a to 17d as the gains Ga to Gd, respectively. Accordingly, when the spot S has a positional deviation with respect to the photodetector 37, there is a possibility that, to be precise, the objective lens 36 is deviated from the in-focus position at the timing at which the FE signal level Lfe becomes 0. However, here, the position at which the FE signal level Lfe becomes 0 is detected as a temporary in-focus position.

After the temporary in-focus position is detected in S1, the control unit 20 instructs the servo signal processing unit 18 to start the focus servo control (S2). Subsequently, the servo signal processing unit 18 executes the focus servo control in which the distance between the objective lens 36 and the optical disc medium M is adjusted so as to keep the FE signal level Lfe indicating 0. With this configuration, for example, even if the surface of the optical disc medium M has moved vertically due to axial runout, the objective lens 36 is moved so as to follow this motion, and hence the distance from the objective lens 36 to the signal surface of the optical disc medium M can be kept constant.

Subsequently, the control unit 20 executes focus bias adjustment processing in which a focus bias value is adjusted (S3). The focus bias value (hereinbelow, referred to as an FB value) is an offset value which is set with respect to the FE signal level Lfe at the time of the focus servo control. If the control unit 20 changes the FB value, the servo signal processing unit 18 changes the position of the objective lens 36 so that the FE signal level Lfe to which the changed FB value is applied as the offset becomes 0. In other words, by changing the FB value, the servo signal processing unit 18 can change the distance between the objective lens 36 and the signal surface of the optical disc medium M by an amount corresponding to the change of the FB value even when the focus servo control is in execution.

As described above, there is a possibility that the position of the objective lens 36 obtained when the focus servo control is started in S2 is deviated from a real in-focus position. The focus bias adjustment processing is such control that, when the focus servo control is in execution, allows the objective lens 36 to be moved to a position at which higher accuracy of reading information from the optical disc medium M may be obtained. By executing such processing, it is possible to move the objective lens 36 closer to the real in-focus position.

Specifically, the control unit 20 changes the FB value to various values, and performs trial readings from the optical disc medium M with the respective FB values set. Then, the control unit 20 acquires the evaluation values for reading accuracy (in this case, jitter values) which are calculated correspondingly by the recorded signal processing unit 19. Subsequently, based on the plurality of evaluation values acquired through such processing, which respectively correspond to the plurality of FB values, an FB value with which a good evaluation value is expected (hereinbelow, referred to as adjusted FB value) is calculated. The focus servo control is performed so that, with the adjusted FB value set as the offset, the FE signal level Lfe becomes 0. As a result, compared to the temporary in-focus position detected in S1, the objective lens 36 is moved closer to the real in-focus position.

Figure 5:
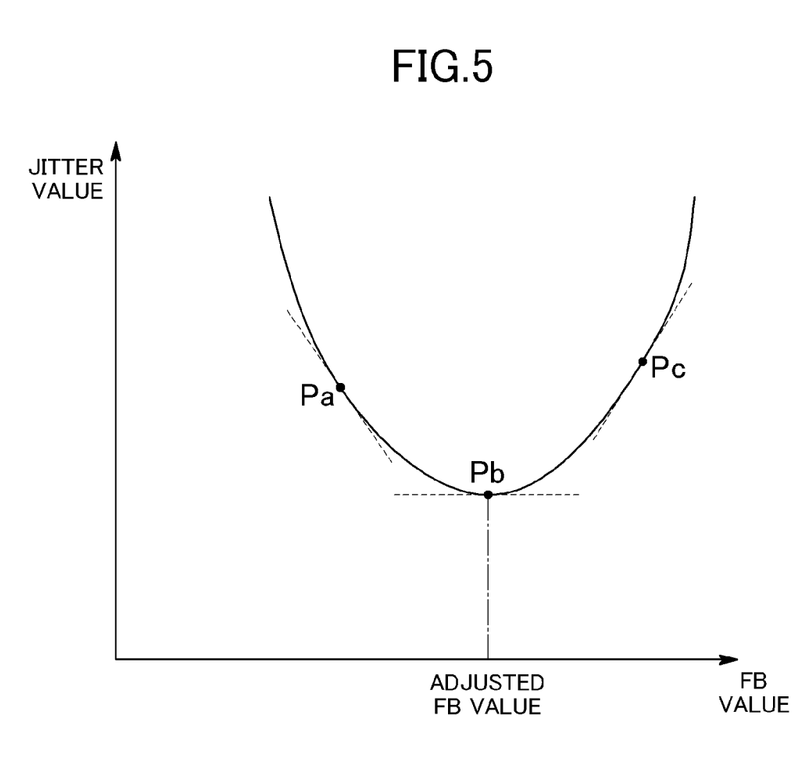
FIG. 5 is a graph showing an example of a relation between a focus bias value and an evaluation value for reading accuracy.

Description is now given of a specific example of a method of calculating the adjusted FB value. In general, between the FB value and the evaluation value for reading accuracy (in this case, jitter value), there is established a relation which can be approximated to a parabola. FIG. 5 is a graph showing an example of the relation between the FB value and the jitter value. In this figure, the horizontal axis (X-axis) indicates the FB value, and the longitudinal axis (Y-axis) indicates the jitter value. In this example, the jitter value is used as the evaluation value, and hence as the value thereof is smaller, the reading accuracy is higher. In FIG. 5, the relation between the FB value and the jitter value is represented by a concave upward parabola, and thus the FB value which attains the highest reading accuracy is a value on the X-axis which corresponds to the vertex of the parabola. Accordingly, by setting the value on the X-axis which corresponds to a position in the vicinity of the vertex of the parabola as the adjusted FB value, the jitter value can be made smaller (that is, the accuracy of information reading can be improved).

In view of this, the optical disc device 1 measures, as sample data, the jitter values by respectively setting at least three or more FB values which are different from one another. Here, three or more pieces of the sample data are necessary because accurate approximation to a parabola cannot be performed unless at least three points as exemplified in FIG. 5 are identified on the parabola. Those points are a point Pa at which the slope of the tangent line is negative, a point Pb at which the slope of the tangent line is almost 0, and a point Pc at which the slope of the tangent line is positive. After measuring the three or more pieces of the sample data, the control unit 20 calculates a parabola, which is obtained by approximating those pieces of the sample data, by such a method as a least square method, and then calculates, as the adjusted FB value, the FB value which corresponds to the position of the vertex of the parabola.

Further, in this embodiment, in a state in which the adjusted FB value has been set through the focus bias adjustment processing of S3, the control unit 20 adjusts the gains Ga to Gd so that the amplified signals obtained by amplifying the output signals from the light-receiving elements Da to Dd by the amplifiers 17*a* to 17*d* all become equal (S4). Gains (adjusted gains) Ga_adj to Gd_adj, which are to be set for the amplifiers 17*a* to 17*d*, respectively, are calculated by the following equations.

$$\begin{cases} Ga\_adj = \dfrac{Lpi}{4} \cdot \dfrac{1}{La} \\ Gb\_adj = \dfrac{Lpi}{4} \cdot \dfrac{1}{Lb} \\ Gc\_adj = \dfrac{Lpi}{4} \cdot \dfrac{1}{Lc} \\ Gd\_adj = \dfrac{Lpi}{4} \cdot \dfrac{1}{Ld} \end{cases} \quad [\text{Math. 1}]$$

In those equations, La to Ld represent the levels of the output signals from the light-receiving elements Da to Dd before the gain adjustment of S4, respectively, and Lpi represents the level of the PI signal before the gain adjustment of S4. When the adjusted gains Ga_adj to Gd_adj thus calculated are set for the amplifiers 17*a* to 17*d*, respectively, the levels of the amplified signals output from the amplifiers 17*a* to 17*d* all become "Lpi/4". With this configuration, while keeping the level Lpi of the PI signal unchanged before and after the adjustment, all the levels of the amplified signals output from the amplifiers 17*a* to 17*d* can be made equal.

After the gain adjustment of S4, all the levels of the amplified signals output from the amplifiers 17*a* to 17*d* are made equal, and hence the FE signal level Lfe becomes 0 in the vicinity of the in-focus position. Accordingly, the control unit 20 resets the FB value to 0 (S5). With this configuration, the servo signal processing unit 18 performs the focus servo control so that the original FE signal level Lfe itself, which has no offset value, becomes 0. Subsequently, the optical disc device 1 reads information from the optical disc medium M in a state in which the focus servo control has been performed.

As described above, even when the spot S has a positional deviation with respect to the photodetector 37, the optical disc device 1 according to this embodiment adjusts the gains of the amplifiers 17*a* to 17*d* so that the FE signal level Lfe becomes 0 when the objective lens 36 is at the in-focus position. Therefore, the focus servo control can be performed with high accuracy. In particular, in this embodiment, as described with reference to the flow chart of FIG. 4, the gain adjustment processing of S4 is performed in the state in which the adjusted FB value has been set through the focus bias adjustment processing of S3. Specifically, after the objective lens 36 is moved to the temporary in-focus position through the focus detection processing of S1, the objective lens 36 is further moved to the position closer to the real in-focus position by utilizing the evaluation value for reading accuracy. After that, the gain adjustment processing is performed. Therefore, compared to a case where, after the focus detection processing, the gain adjustment processing is executed without executing the focus bias adjustment processing, it is possible to perform such gain adjustment that enables the FE signal level Lfe to become 0 with higher accuracy.

Figure 6A:
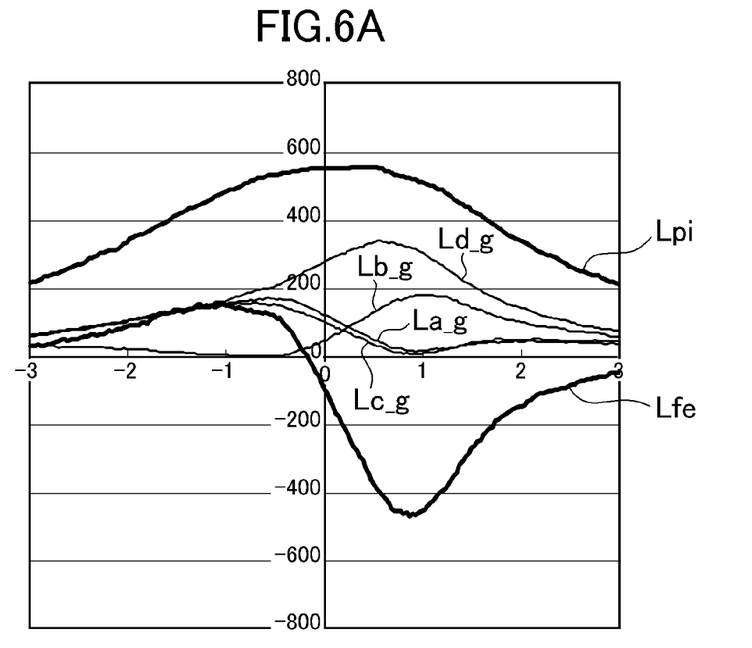
FIG. 6A is a graph, in a case where gain adjustment is not performed, showing simulation results for signals measured when an objective lens is positioned closer to a center of an optical disc medium compared to an optical axis position.
Figure 6B:
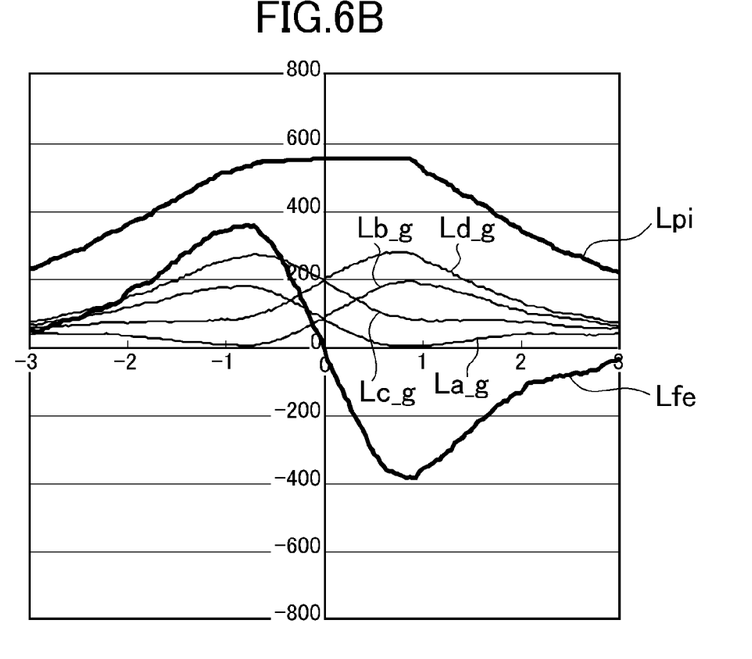
FIG. 6B is a graph, in the case where the gain adjustment is not performed, showing simulation results for signals measured when the objective lens is at the optical axis position.
Figure 6C:
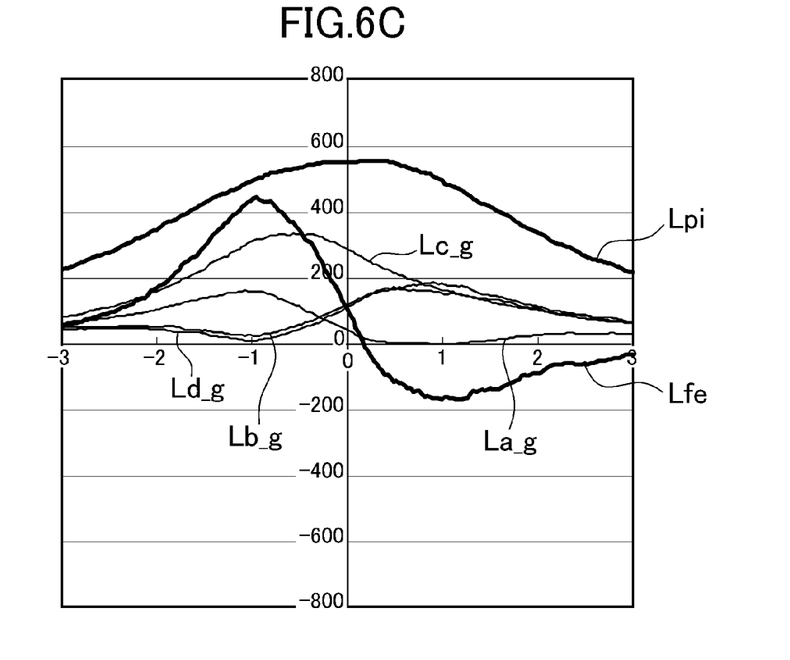
FIG. 6C is a graph, in the case where the gain adjustment is not performed, showing simulation results for signals measured when the objective lens is positioned closer to a periphery of the optical disc medium compared to the optical axis position.
Figure 7A:
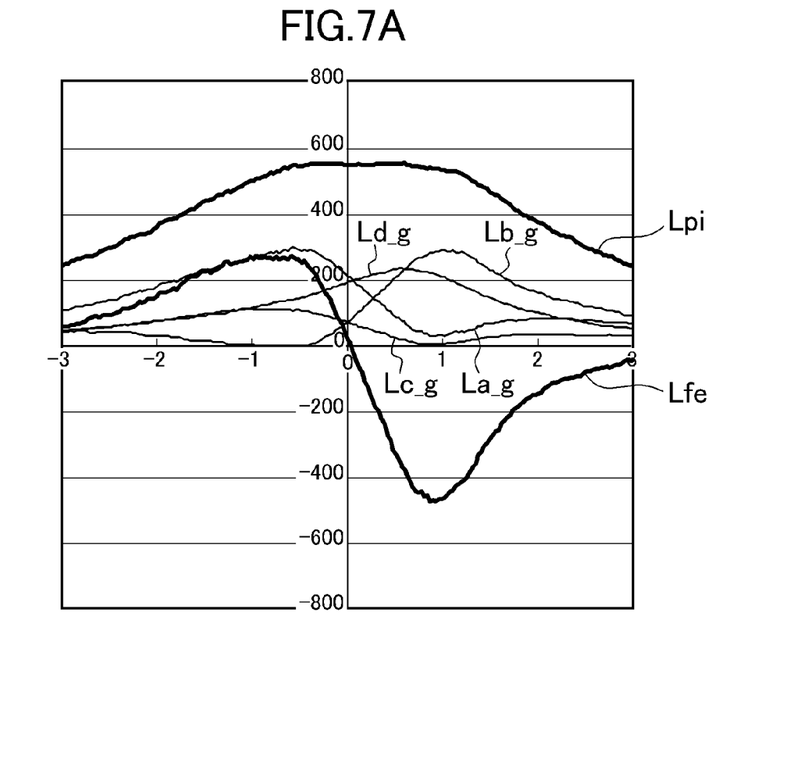
FIG. 7A is a graph, in a case where the gain adjustment is performed by the optical disc device according to the first embodiment of the present invention, showing simulation results for signals measured when the objective lens is positioned closer to the center of the optical disc medium than the optical axis position.
Figure 7B:
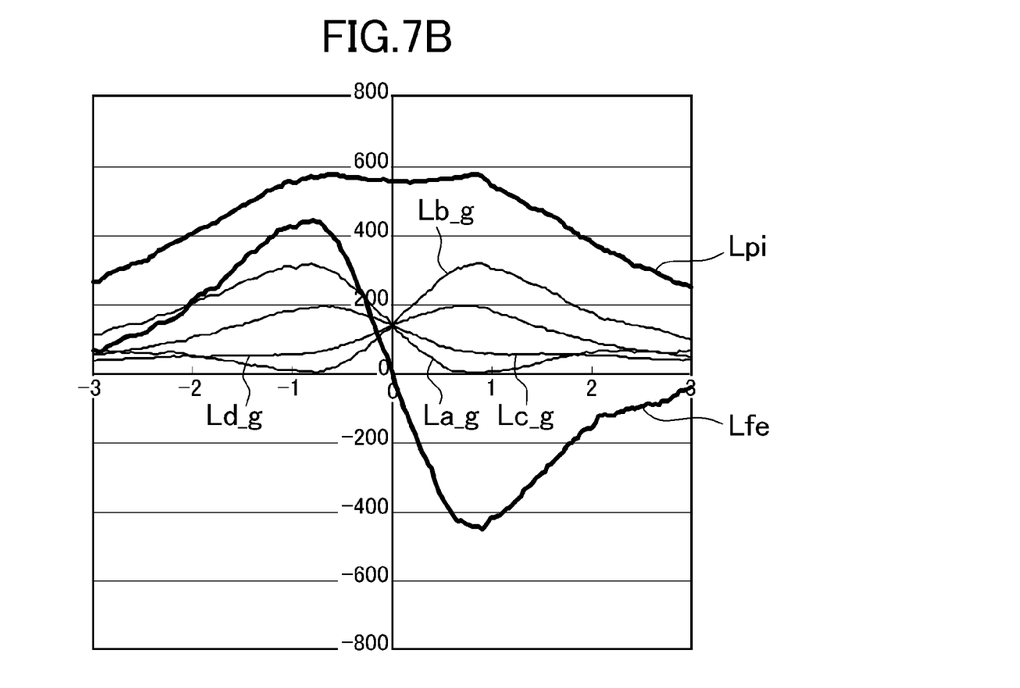
FIG. 7B is a graph, in the case where the gain adjustment is performed by the optical disc device according to the first embodiment of the present invention, showing simulation results for signals measured when the objective lens is at the optical axis position.
Figure 7C:
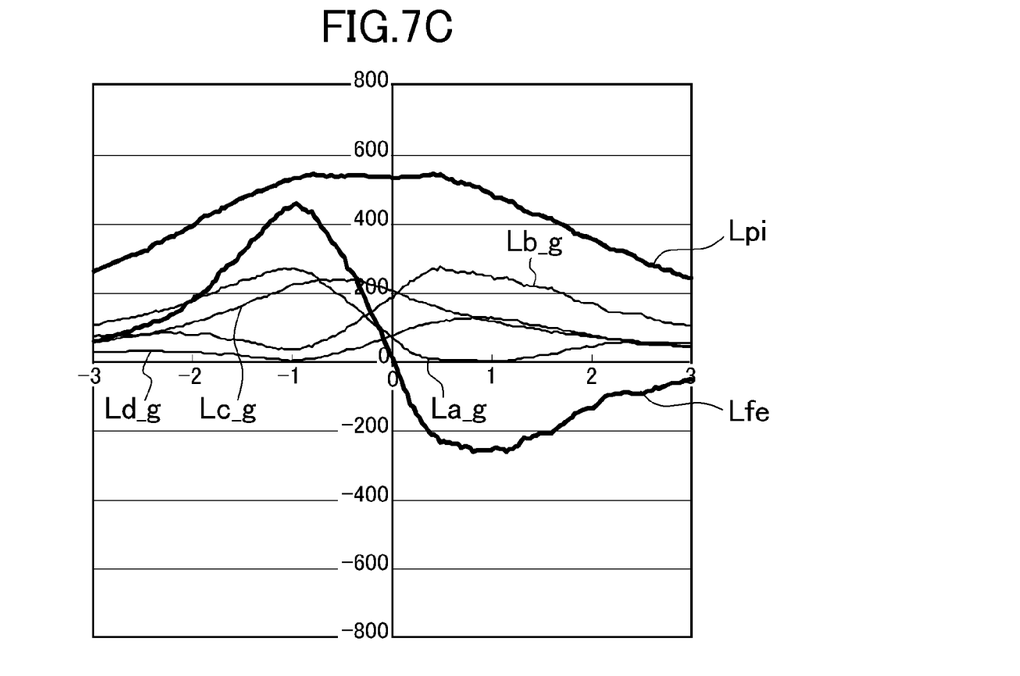
FIG. 7C is a graph, in the case where the gain adjustment is performed by the optical disc device according to the first embodiment of the present invention, showing simulation results for signals measured when the objective lens is positioned closer to the periphery of the optical disc medium than the optical axis position.

FIGS. 6A to 6C and FIGS. 7A to 7C are graphs for describing effects of the gain adjustment performed by the optical disc device 1 according to this embodiment, and each show results of executing a simulation regarding the FE signal level Lfe and the PI signal level Lpi which are measured by the optical disc device 1, and the levels La_g to Ld_g of the amplified signals output from the amplifiers 17a to 17d, respectively. In each graph, the horizontal axis indicates the position of the objective lens 36, and the origin thereof indicates the in-focus position. Further, the longitudinal axis indicates the level of each signal. Further, FIGS. 6A to 6C are graphs obtained when the above-mentioned gain adjustment is not performed, whereas FIGS. 7A to 7C are graphs obtained when the gain adjustment is performed by the above-mentioned method. Further, FIG. 6B and FIG. 7B are graphs obtained when the position of the objective lens 36 along the tracking direction coincides with the optical axis of the laser beam (optical axis position), whereas FIG. 6A and FIG. 7A are graphs obtained when the objective lens 36 is moved along the tracking direction from the optical axis position so as to be closer to the center of the optical disc medium M by 0.4 mm. Further, FIG. 6C and FIG. 7C are graphs obtained when the objective lens 36 is moved along the tracking direction from the optical axis position so as to be closer to the periphery of the optical disc medium M by 0.4 mm. As shown in FIG. 7B, with the adoption of the gain processing of this embodiment, the gains Ga to Gd are adjusted so that the levels of the amplified signals output from the amplifiers 17a to 17d become equal when the objective lens 36 is at the in-focus position (origin position on the horizontal axis in FIG. 7B).

As shown in FIGS. 6A to 6C, when the gain adjustment is not performed, though the objective lens 36 is at the in-focus position, the levels of the amplified signals output from the amplifiers 17a to 17d are not equal, and hence, as a result, the FE signal level Lfe does not become 0. Note that, in FIG. 6B, despite the fact that the levels of the amplified signals are not equal, the FE signal level Lfe incidentally becomes substantially 0 at the origin position on the horizontal axis, but when the objective lens 36 moves along the tracking direction, the FE signal level Lfe is deviated from 0 as shown in FIGS. 6A and 6C. On the other hand, when the gain adjustment is performed, as shown in FIGS. 7A to 7C, the levels of the amplified signals obtained when the objective lens 36 is at the in-focus position change as the objective lens 36 moves along the tracking direction. However, the FE signal level Lfe is maintained substantially at 0 regardless of where the objective lens 36 is positioned along the tracking direction. As described above, according to the gain adjustment processing of this embodiment, even when the objective lens 36 moves along the tracking direction, it is possible to prevent the FE signal level Lfe at the in-focus position from deviating from 0.

Second Embodiment

Next, an optical disc device according to a second embodiment of the present invention is described. Note that, a hardware configuration of the optical disc device according to the second embodiment is the same as the hardware configuration of the optical disc device according to the first embodiment illustrated in FIGS. 1 and 2. Detailed description thereof is therefore omitted herein, and the same components as those of the first embodiment are denoted by the same reference symbols.

Similarly to the optical disc device according to the first embodiment, the optical disc device according to this embodiment performs the gain adjustment for bringing the position of the objective lens 36 obtained when the FE signal level Lfe becomes 0 closer to the in-focus position, but its adjustment method is different from that of the first embodiment. Specifically, in this embodiment, the control unit 20 first controls the objective lens driving unit 38 to move the objective lens 36 along the focus direction after starting from a predetermined initial position. On this occasion, the control unit 20 moves the objective lens 36 in a given range including the in-focus position. In other words, the movement range of the objective lens 36 is such a range that includes an S-shaped waveform which appears in the FE signal in the vicinity of the in-focus position. Further, the control unit 20 acquires respective maximum values of the levels La_g to Ld_g of the amplified signals output from the amplifiers 17a to 17d while the objective lens 36 is moved within the given range. Hereinbelow, the maximum values of the amplified signals output from the amplifiers 17a to 17d are referred to as peak levels Pa to Pd, respectively. The peak levels Pa to Pd can be measured by, for example, a known peak-hold circuit.

Then, based on the acquired values of the peak levels Pa to Pd, the control unit 20 performs the gain adjustment so that the peak levels of the output signals from the amplifiers 17a to 17d are made equal. Specifically, in this embodiment, the adjusted gains Ga_adj to Gd_adj are calculated by the following equations:

$$\begin{cases} Ga\_adj = \dfrac{SUM}{4} \cdot \dfrac{1}{Pa} \\ Gb\_adj = \dfrac{SUM}{4} \cdot \dfrac{1}{Pb} \\ Gc\_adj = \dfrac{SUM}{4} \cdot \dfrac{1}{Pc} \\ Gd\_adj = \dfrac{SUM}{4} \cdot \dfrac{1}{Pd} \end{cases} \quad [\text{Math. 2}]$$

where SUM represents a total value of the peak levels Pa to Pd. In other words, SUM is calculated by the following equation.

$$SUM = Pa + Pb + Pc + Pd$$

Note that, the peak levels of the amplified signals output from the amplifiers 17a to 17d are obtained at different timings, and all the peak levels do not necessarily correspond to the levels of the amplified signals when the objective lens 36 is at the in-focus position. Thus, compared to the adjustment method of the first embodiment in which the gain adjustment is performed by using the levels of the output signals from the respective light-receiving elements obtained when the objective lens 36 is assumed to be at the real in-focus position, accuracy of the adjustment may decrease with the gain adjustment of this embodiment. However, even with the gain adjustment of this embodiment, compared to the case where the gain adjustment is not performed, it is possible to make the FE signal level Lfe obtained when the objective lens 36 is at the in-focus position closer to 0. Further, in this embodiment, the gain adjustment is performed using the peak levels obtained when the objective lens 36 is moved along the focus direction in the given range, and hence, compared to the adjustment method according to the first embodiment, it is possible to perform the gain adjustment with quicker and easier processing. In other words, according to this embodiment, without taking procedures of starting the focus servo control by detecting the temporary in-focus position, and further executing the focus bias adjustment processing in that state, the gain adjustment can be performed immediately after the peak levels are measured once. Note that, in general, the optical disc device first measures the signal levels by moving the objective lens 36 in the range including the in-focus position in order to determine the type of the optical disc medium M or acquire information regarding the reflectivity of the optical disc medium M in advance so as to correct the individual difference of the optical disc medium M. Accordingly, if the measurement of the peak levels for the gain adjustment is performed at the same time on this occasion, the optical disc device according to this embodiment can start the focus servo control with the gains adjusted in advance, without performing an extra operation for the gain adjustment alone.

Figure 8A:
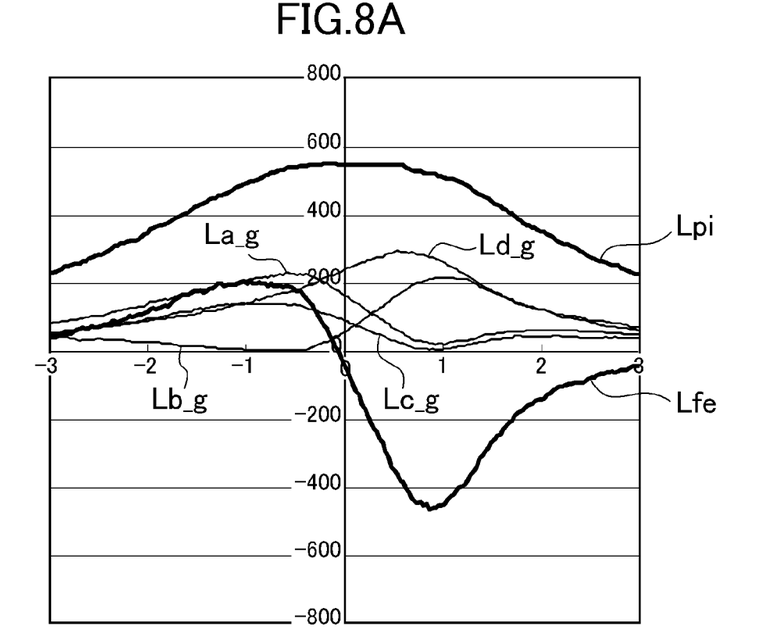
FIG. 8A is a graph, in a case where the gain adjustment is performed by an optical disc device according to a second embodiment of the present invention, showing simulation results for signals measured when the objective lens is positioned closer to the center of the optical disc medium than the optical axis position.
Figure 8B:
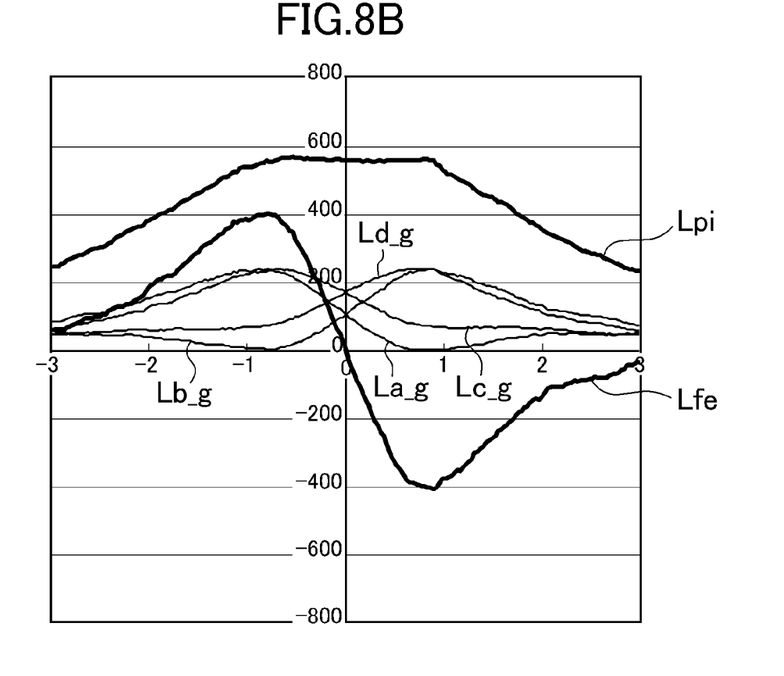
FIG. 8B is a graph, in the case where the gain adjustment is performed by the optical disc device according to the second embodiment of the present invention, showing simulation results for signals measured when the objective lens is positioned at the optical axis position.
Figure 8C:
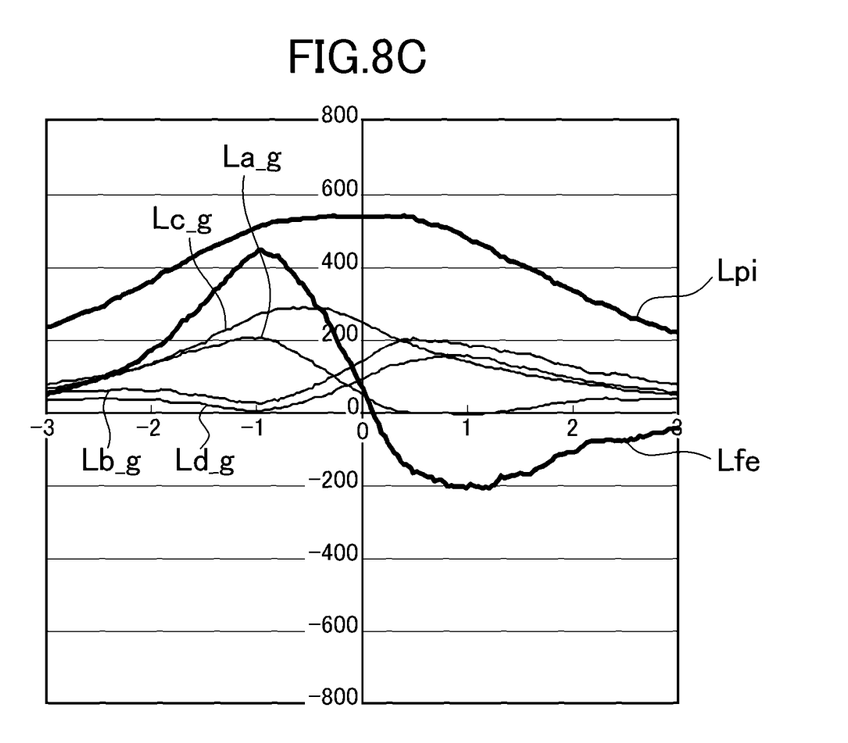
FIG. 8C is a graph, in the case where the gain adjustment is performed by the optical disc device according to the second embodiment of the present invention, showing simulation results for signals measured when the objective lens is positioned closer to the periphery of the optical disc medium than the optical axis position.

FIGS. 8A to 8C are graphs for describing effects of the gain adjustment performed by the optical disc device according to this embodiment, and show simulation results for the respective signals obtained when the gain adjustment of this embodiment is performed under the same conditions as those of FIGS. 6A to 6C, respectively. As shown in FIG. 8B, when the gain adjustment of this embodiment is applied, the peak levels of the amplified signals become equal, and the FE signal level Lfe obtained when the objective lens 36 is at the in-focus position also becomes substantially 0. Note that, compared to FIGS. 7A and 7C, in the case of the gain adjustment according to this embodiment, the FE signal level Lfe obtained when the objective lens 36 is at the in-focus position is slightly deviated from 0 as shown in FIGS. 8A and 8C. However, compared to FIGS. 6A and 6C, it can be seen that the FE signal level Lfe is closer to 0 than in the case where the gain adjustment is not performed.

Note that, the present invention is not limited to the embodiments described above. For example, though in the description given above, the light-receiving elements each have a rectangular detection area and are arranged in matrix, the present invention is not limited thereto. However, any light-receiving element may be used as long as the light-receiving elements are arranged in such a manner as to divide the spot S of the reflected light into four areas with crossed lines, and generate the focus error signal for detecting the in-focus position through an astigmatism method.

While there have been described what are at present considered to be certain embodiments of the invention, it will be understood that various modifications may be made thereto, and it is intended that the appended claims coverall such modifications as fall within the true spirit and scope of the invention.

What is claimed is:

1. An optical disc device for reading information recorded on an optical disc medium, comprising:
   an objective lens for focusing light onto the optical disc medium;
   a plurality of light-receiving elements arranged in an array, each for receiving reflected light from the optical disc medium and outputting an output signal corresponding to a light amount of the reflected light;
   a plurality of amplifiers each for amplifying the output signal output from a corresponding one of the plurality of light-receiving elements;
   a signal output circuit for outputting, based on amplified signals respectively output from the plurality of amplifiers, a focus error signal indicating a deviation of a focal position of the objective lens with respect to a signal surface of the optical disc medium;
   a focus servo control unit for controlling, based on the focus error signal, a position of the objective lens so as to keep constant a distance between the objective lens and the signal surface;
   a position adjusting unit for moving the objective lens to a first temporary in-focus position, and then moving said objective lens to a second in-focus position at which accuracy of reading the information from the optical disc medium becomes higher than at the first temporary in-focus position; and
   a gain adjusting unit for adjusting a gain of each of the plurality of amplifiers after said objective lens has been moved to said second in-focus position, so that levels of the amplified signals respectively output from the plurality of amplifiers become close to each other,
   wherein the first temporary in-focus position is a position of the objective lens where the focus error signal is adjusted,
   wherein the second in-focus position is a position of the objective lens where the focus servo control unit moves the objective lens to the second in-focus position based on a focus bias value and the plurality of amplifiers are adjusted after adjusting for the focus error signal, and
   wherein the focus bias value is adjusted based on reading an evaluation value.

2. The optical disc device according to claim 1, wherein the gain adjusting unit adjusts the gain of the each of the plurality of amplifiers so that the levels of the amplified signals respectively output from the plurality of amplifiers become close to each other after the position adjusting unit moves the objective lens to the second in-focus position, and that a total sum of the amplified signals respectively output from the plurality of amplifiers does not change before and after the adjustment.

3. The optical disc device according to claim 1, wherein the position adjusting unit acquires, by changing the position of the objective lens, a plurality of evaluation values each indicating the accuracy of reading the information from the optical disc medium at one of a plurality of different positions, and moves the objective lens to a position determined based on the acquired plurality of evaluation values.

4. The optical disc device according to claim 3, wherein each of the plurality of evaluation values comprises a jitter value.

5. A method of controlling an optical disc device,
   the optical disc device comprising:
   an objective lens for focusing light onto an optical disc medium having information recorded thereon;
   a plurality of light-receiving elements arranged side by side, each for receiving reflected light from the optical disc medium and outputting an output signal corresponding to a light amount of the reflected light;
   a plurality of amplifiers each for amplifying the output signal output from a corresponding one of the plurality of light-receiving elements; and
   a signal output circuit for outputting, based on amplified signals respectively output from the plurality of amplifiers, a focus error signal indicating a deviation of a focal position of the objective lens with respect to a signal surface of the optical disc medium,
   the method comprising:
   a focus servo control step of controlling, based on the focus error signal, a position of the objective lens so as to keep constant a distance between the objective lens and the signal surface;
   a position adjusting step of moving the objective lens to a first temporary in-focus position, and then moving said objective lens to a second in-focus position at which accuracy of reading the information from the optical disc medium becomes higher than at the first temporary in-focus position; and
   a gain adjusting step of adjusting a gain of each of the plurality of amplifiers after said objective lens has been moved to said second in-focus position, so that levels of the amplified signals respectively output from the plurality of amplifiers become close to each other,
   wherein the first temporary in-focus position is a position of the objective lens where the focus error signal is adjusted, wherein the second in-focus position is a position of the objective lens where the objective lens is moved to the second in-focus position based on a focus bias value and the plurality of amplifiers are adjusted after adjusting for the focus error signal, and wherein the focus bias value is adjusted based on reading an evaluation value.

6. A non-transitory computer-readable information storage medium having stored thereon a program for controlling an optical disc device, the optical disc device comprising:

an objective lens for focusing light onto an optical disc medium having information recorded thereon;

a plurality of light-receiving elements arranged side by side, each for receiving reflected light from the optical disc medium and outputting an output signal corresponding to a light amount of the reflected light;

a plurality of amplifiers each for amplifying the output signal output from a corresponding one of the plurality of light-receiving elements; and a signal output circuit for outputting, based on amplified signals respectively output from the plurality of amplifiers, a focus error signal indicating a deviation of a focal position of the objective lens with respect to a signal surface of the optical disc medium, the program including instructions that cause a computer to:

control, based on the focus error signal, a position of the objective lens so as to keep constant a distance between the objective lens and the signal surface;

move the objective lens to a first temporary in-focus position, and then moving said objective lens to a second in-focus position at which accuracy of reading the information from the optical disc medium becomes higher than at the first temporary in-focus position; and adjust a gain of each of the plurality of amplifiers after said objective lens has been moved to said second in-focus position, so that levels of the amplified signals respectively output from the plurality of amplifiers become close to each other, wherein the first temporary in-focus position is a position of the objective lens where the focus error signal is adjusted, wherein the second in-focus position is a position of the objective lens where the objective lens is moved to the second in-focus position based on a focus bias value and the plurality of amplifiers are adjusted after adjusting for the focus error signal, and wherein the focus bias value is adjusted based on reading an evaluation value.

7. The optical disc device of claim 1, wherein the position adjusting unit moves the objective lens in an axial direction closer to, or further away from said signal surface.

8. The optical disc device of claim 7, wherein said position adjusting unit moves the objective lens to an in-focus position with respect to a distance from said signal surface.

9. The optical disc device of claim 1, wherein the focus bias is set to zero after the gain adjusting unit has adjusted the gain of each of the plurality of amplifiers.

10. The method of claim 5, further comprising setting the focus bias to zero after adjusting the gain of each of the plurality of amplifiers.

11. The non-transitory computer-readable information storage medium of claim 6, wherein the program includes instructions that further cause the computer to set the focus bias to zero after adjusting the gain of each of the plurality of amplifiers.

12. The optical disc device of claim 1, wherein the amplifier gains are adjusted only after the second in-focus position.

* * * * *